(12) United States Patent
McDowell

(10) Patent No.: US 6,745,305 B2
(45) Date of Patent: Jun. 1, 2004

(54) ZEROED BLOCK OPTIMIZATION IN DISK MIRRORING APPLICATIONS

(75) Inventor: Steven R. McDowell, Lexington, SC (US)

(73) Assignee: NCR Corporation, Dayton, OH (US)

(*) Notice: Subject to any disclaimer, the term of this patent is extended or adjusted under 35 U.S.C. 154(b) by 502 days.

(21) Appl. No.: 09/736,523

(22) Filed: Dec. 13, 2000

(65) Prior Publication Data

US 2002/0073278 A1 Jun. 13, 2002

(51) Int. Cl.[7] .............................................. G06F 12/16
(52) U.S. Cl. ...................................................... 711/162
(58) Field of Search ............................... 711/161, 162; 707/204

(56) References Cited

U.S. PATENT DOCUMENTS

| | | | |
|---|---|---|---|
| 5,537,533 A | 7/1996 | Staheli et al. ................... | 714/5 |
| 5,559,991 A | 9/1996 | Kanfi .......................... | 711/162 |
| 5,778,395 A | 7/1998 | Whiting et al. ............. | 707/204 |
| 5,835,953 A | 11/1998 | Ohran ......................... | 711/162 |
| 6,073,221 A * | 6/2000 | Beal et al. ................... | 711/162 |
| 6,378,054 B1 * | 4/2002 | Karasudani et al. ........ | 711/161 |

* cited by examiner

Primary Examiner—Reginald G. Bragdon
(74) Attorney, Agent, or Firm—James M. Stover

(57) ABSTRACT

Methods for optimizing disk mirroring synchronization and write operations. Disk mirror synchronization, wherein date stored on a first storage device is duplicated on a second storage device, is performed by examining each data block contained within the first storage device and identifying data blocks that contain only zero data and data blocks containing non-zero data. Requests are sent to the second storage device to create a zeroed data block corresponding to each data block on the first disk device that contains only zero data. A copy of each data block on the first disk drive that contains non-zero data is written to the second storage device. Disk mirror write operations, wherein data written to the first storage device is duplicated on the second storage device, are optimized by intercepting write requests directed to the first storage device, and examining each data block within the write requests to determine if the data block contains only zero data. If a data block contains only zero data, a request is sent to the second storage device to create a zeroed block. If a data block contains non-zero data, the data block is transmitted to the second storage device.

10 Claims, 3 Drawing Sheets

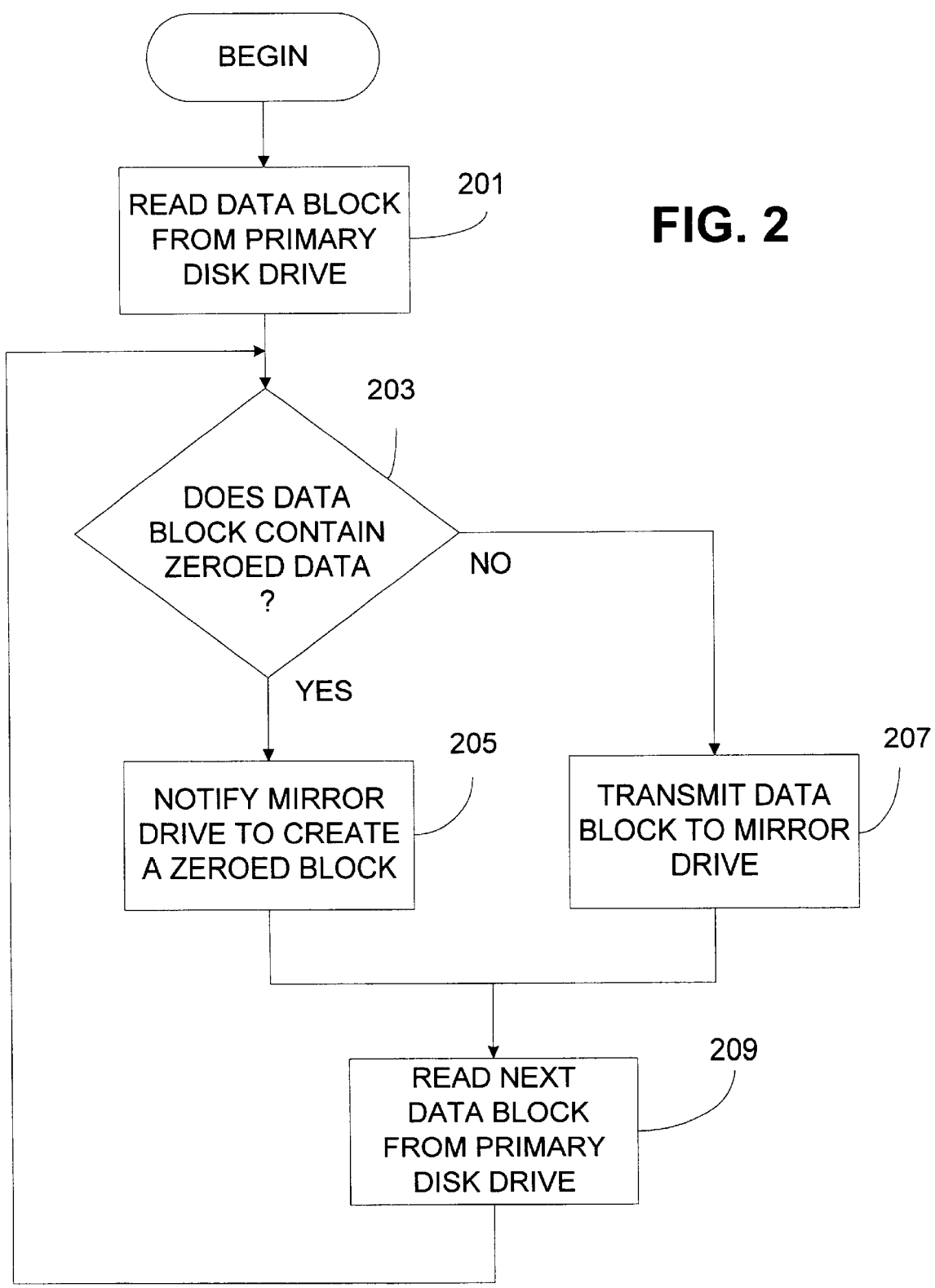

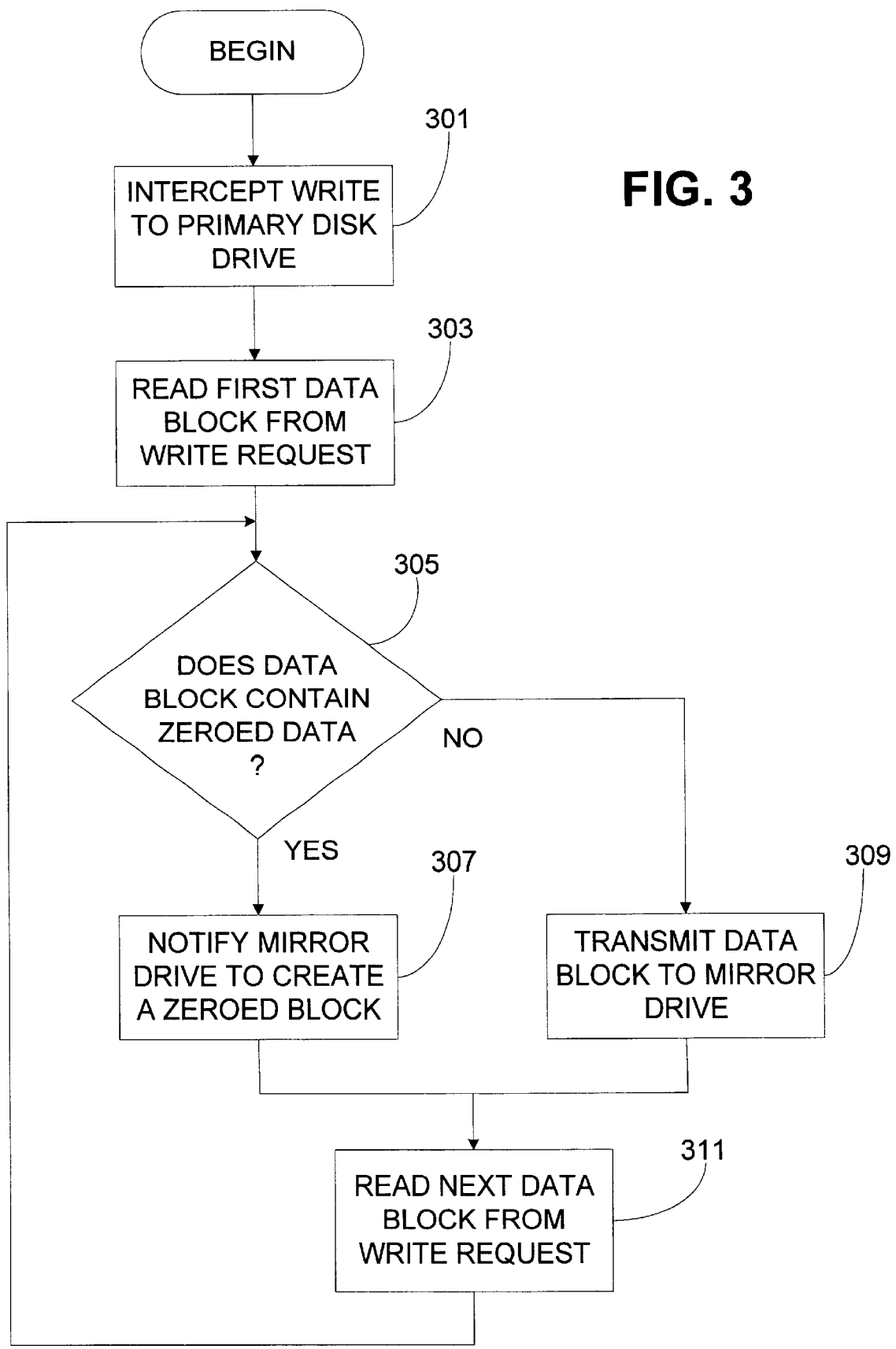

ZEROED BLOCK OPTIMIZATION IN DISK MIRRORING APPLICATIONS

The present invention relates to high availability computer storage systems and, more particularly, to methods for mirroring disk drives within a network.

BACKGROUND OF THE INVENTION

The increased reliance by business on On-Line Transaction Processing and Decision Support Systems has increased the demand for high availability systems since these systems are critical to the functioning of day-to-day activities in many businesses. These systems are not only essential for the support of normal daily operations, but they also store critically important customer and corporate data. Continuous availability is no longer an ideal; it is a necessity for many companies. Longer work days, expansion into new markets and customer demand for more efficient service create an expanded requirement for increased system availability. Users are demanding a means of ensuring very high availability of their applications and the access to data that permits them to accomplish their tasks and provide the highest levels of customer service. Interruption of workflow due to system failure is expensive and it can cause the loss of business. The need to increase computer system availability is becoming one of businesses key concerns.

Implementation of client/server computing is growing throughout today's businesses—for key business applications as well as electronic mail, distributed databases, file transfer, retail point-of-sale, inter-networking, and other applications. It is possible for companies to gain competitive advantages from client/server environments by controlling the cost of the technology components through economies of scale and the use of clustered computing resources. There is a boost in productivity when businesses have high availability and easy access to information throughout the corporate enterprise.

An important component of a high-availability client/server system is a reliable, fault-tolerant data storage system. In some networked or "clustered" multiple server arrangements, the physical data storage system may be a shared RAID (Redundant Array of Inexpensive Disks) disk array system, or a shared pair of disk drives or disk arrays operating in a mirrored arrangement.

A disk mirroring system, also referred to as a RAID Level 1 system, typically consists of two equal-capacity disk drives that mirror one another. One disk drive contains a duplicate of all the files contained on the other disk drive, each drive essentially functioning as a backup for the other disk drive. Should one of the disk drives fail all the data and applications contained on the failed drive are available from the remaining disk drive. The mirror drives may be co-located such as in a single personal computer or server computer, or may reside at different locations within a network. The drives may be logical drives, partitions or drive arrays. They do not need to be equivalent in all aspects or of equal capacity.

Most disk mirroring procedures utilizing shared drives will write or update both mirror drives synchronously. In systems performing disk mirroring with non-shared drives over a network, writes directed to a primary drive are received and forwarded to the secondary mirror drive. Upon receipt from the secondary drive of an acknowledgement signal indicating a successful update of the secondary drive, the write to the primary is completed.

A computer system including multiple servers and a pair of shared disk drives is shown in FIG. 1. FIG. 1 provides a diagram of clustered or networked computers having a primary server 101 and a secondary server 103 in a fail-over pair arrangement. Primary server 101 is the preferred application server of the pair, and secondary server 103 preferably provides fail-over protection for the primary server. The primary and secondary servers are coupled through a network bus system 105 to a plurality of client computers 107 though 109. The primary and secondary servers 101 and 103 each shares access to a pair of disk storage devices 111 and 113. Disk storage devices 111 and 113 are SCSI (Small Computer Systems Interface) disk drives or disk arrays connected to servers 101 and 103 through a pair of SCSI busses 115 and 117.

Primary disk storage device 111 and secondary disk storage device 113 are two equal-capacity storage devices that mirror each other. Each storage device contains a duplicate of all files contained on the other storage device, and a write or update to one storage device updates both devices in the same manner. In the event that either storage device fails, the data contained therein remains available to the system from the operational mirror storage device.

After the disk mirrors are established, the drives on the primary and secondary servers are synchronized, and both servers are up and running, disk mirroring conventionally proceeds as follows:

1. After the initial mirror is established, the system locks out all user access to the secondary drive 113. Reads and writes are not allowed to the secondary drive 113. The primary server drive 111 is accessible for both reads and writes.
2. Whenever the primary server 101 receives a write request for mirrored drive 111 the request is sent to the secondary mirrored drive 113 first. The secondary system 103 executes the write request on its mirrored drive and then sends the status of the write back to the primary server 101. The primary server 101 does nothing on the write request until the secondary server 103 returns its status.
3. When the secondary server 103 returns a successful status, the primary server 101 executes the write to its mirrored drive 111. Should an error occur while the secondary server 103 executes its mirrored drive write, the write process on the secondary server is terminated. The primary server then completes the write request on its mirrored drive and the status of the mirror then changes from Normal to Broken.
4. The secondary mirrored drive 113 is locked to all users once the mirror is created. Locking the secondary mirrored drive 113 ensures that data on both the primary and secondary mirrored drives is not corrupted through an inadvertent write to the secondary mirrored drive. When a mirror is deleted, the secondary mirrored drive is unlocked and full access is again allowed to both the primary drive 111 and secondary drive 113.

In disk mirroring applications, particularly disk mirroring applications utilizing non-shared drives over a network, it can be a very expensive operation in terms of processing time and network bandwidth to write a disk block from one disk drive to its mirror disk drive. A method for synchronizing mirrored disk volumes and writing data to a mirrored drive that reduces the overall expense of disk mirroring operations, particularly when mirroring non-shared disk drives over a network, is desired.

OBJECTS OF THE INVENTION

It is therefore an object of the present invention to provide a new and method for mirroring storage devices that reduces the expense of synchronizing mirrored disk volumes and writing data to a mirrored drive.

It is another object of the present invention to provide such a method for mirroring storage devices over a network that reduces the processing time and network bandwidth required to write a disk block from a primary disk drive to a secondary mirror disk drive.

It is yet another object of the present invention to provide a new and useful method for mirroring storage devices that optimizes disk mirror synchronization operations.

It is a still further object of the present invention to provide a new and useful method for mirroring storage devices that optimizes disk mirror write operations.

SUMMARY OF THE INVENTION

There is provided, in accordance with the present invention, methods for duplicating data stored on a first storage device on a second storage device, and for duplicating data written to a first data storage device on a second data storage device.

The method for duplicating data stored on a first storage device on a second storage device comprises the steps of: examining each data block contained within the first storage device and identifying data blocks that contain only zero data and data blocks containing non-zero data; sending a request to the second storage device to create a zeroed block corresponding to each data block that contains only zero data; and writing to the second storage device a copy of each data block containing non-zero data.

The method for duplicating data written to a first data storage device on a second data storage device comprises the steps of: intercepting a write request directed to the first storage device, the write request including at least one data block; and for each data block included within the write request: (1) examining the data block to determine if the data block contains only zero data; (2) if the data block contains only zero data, sending a request to the second storage device to create a zeroed block; and (3) if the data block contains non-zero data, transmitting the data block to the second storage device.

The above and other objects, features, and advantages of the present invention will become apparent from the following description and the attached drawings.

BRIEF DESCRIPTION OF THE DRAWINGS

FIG. 2 is a simplified flow diagram illustrating a method for establishing a mirror disk within a disk mirroring system in accordance with the present invention.

FIG. 3 is a simplified flow diagram illustrating a method for updating data blocks on a mirror disk within a disk mirroring system in accordance with the present invention.

DETAILED DESCRIPTION OF THE PREFERRED EMBODIMENT

Figure 1:
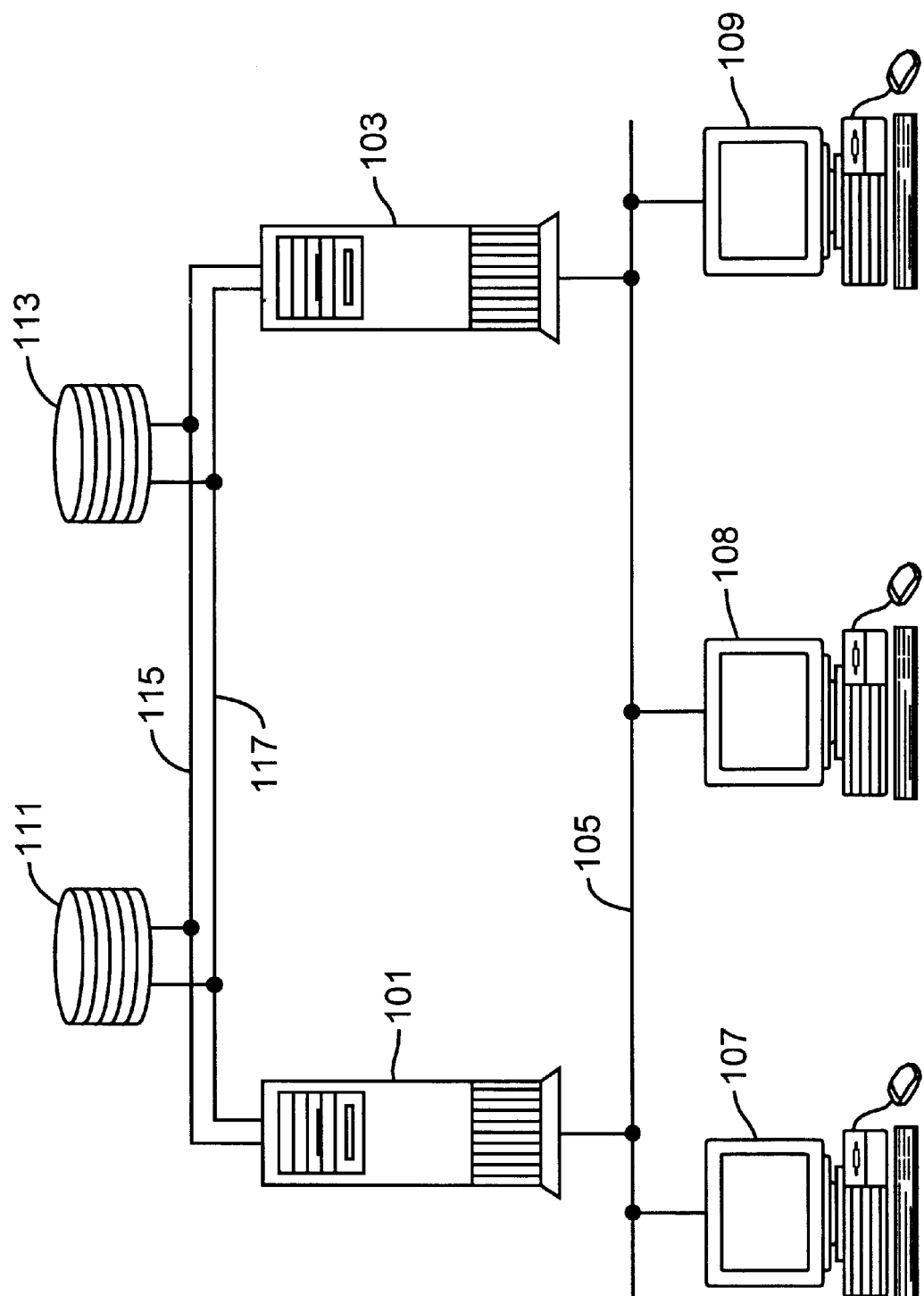
FIG. 1 is a diagram of a clustered computer system including primary and secondary servers and a pair of shared disk storage devices.

As stated earlier, disk mirroring can be a very expensive operation in terms of processing time and network bandwidth utilized to write a disk block from one disk drive to its mirror disk drive, particularly in a disk mirroring system utilizing non-shared drives over a network. This operation is typically performed in two circumstances in a replicated environment:

1. When primary and secondary mirrored disk drives are initially established, to bring the secondary disk drive into synchronization with primary disk drive; and
2. When a data block on the primary disk drive changes, and that change needs to be propagated to the secondary disk drive.

Simple analysis of a typical disk drive volume reveals that a nontrivial percentage of data blocks within the disk drive volume are "empty" blocks, i.e., each individual byte within the empty data block is a logical zero. These empty blocks can be easily detected by scanning the contents of the block.

The processes of synchronizing mirrored disk volumes and writing data to a mirrored drive can be optimized to dramatically reduce the overall expense of these operations by not propagating zero-populated disk blocks. Rather, if a block contains "zeroed" data, a request to the secondary mirror drive to create a zeroed block is issued instead of transmitting a block full of zeroed data to the secondary drive. The processes for performing mirror synchronization and write mirroring are described below.

Disk Mirror Synchronization

The basic steps for synchronizing primary and secondary disk volumes within a disk mirroring system in accordance with the present invention are illustrated in the flow diagram of FIG. 2.

Following the establishment of a disk mirroring system containing primary and secondary disk drives, the synchronization routine illustrated in FIG. 3 establishes a copy of all data contained on the primary disk drive onto the secondary disk drive. The secondary disk drive is referred to as a mirror drive in FIG. 2. The synchronization routine begins by reading a first data block from the primary disk drive (step 201). The block is then examined to determine if it contains only zero data (step 203). If the data block contains only zero data a request is sent to the secondary, or mirror, drive to create a zeroed block (step 205). The next data block is then read from the primary drive (step 209) and examined to determine if it contains zero data (step 203).

If the examination (step 203) determines that the first data block contains non-zero data, the block is transmitted to the mirror drive (step 207). The next data block is then read from the primary drive (step 209) and examined to determine if it contains zero data (step 203).

The process illustrated in blocks 203 through 209 is repeated until all data blocks contained on the primary disk drive have been examined and replicated on the mirror drive.

Disk Mirror Write

The basic steps for implementing write requests within a disk mirroring system in accordance with the present invention are illustrated in the flow diagram of FIG. 3.

Following the establishment of a disk mirroring system and synchronization of primary and secondary disk drives, write requests to the primary disk drive are mirrored on the secondary disk drive in accordance with the routine illustrated in FIG. 3. The disk mirror write routine begins by intercepting a write request directed to the primary disk drive (step 301). The first data block contained in the write request is then read (step 303) and examined to determine if it contains only zero data (step 305). If the data block contains only zero data a request is sent to the secondary, or mirror, drive to create a zeroed block (step 307). The next data block contained within the write request is then read (step 311) and examined to determine if it contains zero data (step 305).

If the examination (step 305) determines that the first data block contains non-zero data, the block is transmitted to the mirror drive (step 309). The next data block contained within the write request is then read (step 311) and examined to determine if it contains zero data (step 305).

The process illustrated in blocks 305 through 311 is repeated until all data blocks contained within the write request to the primary disk drive have been examined and replicated on the mirror drive.

The foregoing description of methods for optimizing disk mirroring operations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for duplicating data written to a first storage device on a second storage device, the method comprising the steps of:
    intercepting a write request directed to said first storage device, said write request including at least one data block; and
    for each data block included within said write request:
        examining said data block to determine if said data block contains only zero data;
        if said data block contains only zero data, sending a request to said second storage device to create a zeroed block; and
        if said data block contains non-zero data, transmitting said data block to said second storage device.

2. The method for duplicating data written to a first storage device on a second storage device in accordance with claim 1, wherein:
    said first and second storage devices are sited at different locations within a computer network.

3. A method for duplicating data residing on a first storage device on a second storage device, said first storage device containing at least one data block, the method comprising the steps of:
    for each data block contained on said first storage device:
        examining said data block to determine if said data block contains only zero data;
        if said data block contains only zero data, sending a request to said second storage device to create a zeroed block; and
        if said data block contains non-zero data, transmitting said data block to said second storage device.

4. The method for duplicating data written to a first storage device on a second storage device in accordance with claim 3, wherein:
    said first and second storage devices are sited at different locations within a computer network.

5. Apparatus comprising:
    a first storage device connected to receive write requests from a computer system;
    a second storage device connected to said computer system;
    means for intercepting a write request directed to said first storage device, said write request including at least one data block;
    means for examining each data block included with said write request and identifying data blocks that contain only zero data and data blocks containing non-zero data;
    means for sending a request to said second storage device to create a zeroed block corresponding to each data block that contains only zero data; and
    means for writing to said second storage device a copy of each data block containing non-zero data.

6. The apparatus in accordance with claim 5, further comprising:
    a network connecting said first and second storage devices, said first and second storage devices being sited at different locations within said network.

7. Apparatus comprising:
    a first storage device connected to a computer system; said first storage device containing a plurality of data blocks;
    a second storage device connected to said computer system;
    means for examining each data block contained within said first storage device and identifying data blocks that contain only zero data and data blocks containing non-zero data;
    means for sending a request to said second storage device to create a zeroed block corresponding to each data block that contains only zero data; and
    means for writing to said second storage device a copy of each data block containing non-zero data.

8. The apparatus in accordance with claim 7, further comprising:
    a network connecting said first and second storage devices, said first and second storage devices being sited at different locations within said network.

9. Apparatus comprising:
    a first server computer including a first storage device connected to receive write requests from a computer system;
    a second server computer including a second storage device;
    a communications network connecting said first and second server computers; means for intercepting a write request directed to said first storage device, said write request including at least one data block;
    means for examining each data block included with said write request and identifying data blocks that contain only zero data and data blocks containing non-zero data;
    means for sending a request to said second storage device to create a zeroed block corresponding to each data block that contains only zero data; and
    means for writing to said second storage device a copy of each data block containing non-zero data.

10. Apparatus comprising:
    a first server computer including a first storage device connected to receive write requests from a computer system;
    a second server computer including a second storage device;
    a communications network connecting said first and second server computers;
    means for examining each data block contained within said first storage device and identifying data blocks that contain only zero data and data blocks containing non-zero data;
    means for sending a request to said second storage device to create a zeroed block corresponding to each data block that contains only zero data; and
    means for writing to said second storage device a copy of each data block containing non-zero data.

* * * * *